United States Patent [19]

Blum

[11] Patent Number: 4,669,079
[45] Date of Patent: May 26, 1987

[54] METHOD AND APPARATUS FOR BUS ARBITRATION IN A DATA PROCESSING SYSTEM

[75] Inventor: Arnold Blum, Gechingen, Fed. Rep. of Germany

[73] Assignee: International Business Machines Corporation, Armonk, N.Y.

[21] Appl. No.: 789,985

[22] Filed: Oct. 22, 1985

[30] Foreign Application Priority Data

Oct. 31, 1984 [EP] European Pat. Off. ........... 84113060

[51] Int. Cl.$^4$ ............................................. H04J 3/02
[52] U.S. Cl. ................................... 370/85; 340/825.5
[58] Field of Search .......... 370/85; 340/825.5, 825.52, 340/825.51

[56] References Cited

U.S. PATENT DOCUMENTS

| | | | |
|---|---|---|---|
| 4,542,501 | 9/1985 | Chevalet et al. | 370/85 |
| 4,543,629 | 9/1985 | Carey et al. | 370/85 |
| 4,580,261 | 4/1986 | Pelotte | 370/85 |
| 4,586,175 | 4/1986 | Bedard et al. | 370/85 |
| 4,593,282 | 6/1986 | Acampora et al. | 370/85 |

*Primary Examiner*—Douglas W. Olms
*Assistant Examiner*—Kenneth I. Rokoff
*Attorney, Agent, or Firm*—Douglas R. McKechnie

[57] ABSTRACT

In a bus-oriented computer system, the decision as to which unit is to receive the bus takes account of the current status of the bus system and the respective operation to be performed on the bus. For that purpose, status information of the connected units, the bus command to be executed and the address of the requested unit are fed to the allocation logic (arbiter) on separate or commonly used lines, thus avoiding idle times during the use of the bus. By evaluating the bus command, the allocation priority can be dynamically changes in order to suppress bus accesses that are bound to fail from the start.

9 Claims, 7 Drawing Figures

METHOD AND APPARATUS FOR BUS ARBITRATION IN A DATA PROCESSING SYSTEM

DESCRIPTION

This invention relates to a method and an apparatus for controlling a bus in a data processing system. More particularly, it relates to a method and an apparatus for efficiently arbitrating the use of a bus, interconnecting plural data processing units, to a single unit at any one time to allow information to be transferred over the bus between a requesting unit and a requested unit.

CITATION OF THE PRIOR ART

A bus is an electrical connection to which several electronic components, such as processors, are linked for exchanging signals according to a predetermined pattern. In modern electronic systems, such connecting lines are frequently used both inside a particular device and over shorter or longer distances for interconnecting several devices. A summary on possible bus applications is contained in the article series by B. Wiemann "Bussysteme", printed in RTP, Vol, 1, 1982 and subsequent volumes. Buses within a computer system are described, for example, by K. J. Thurber et al. "A systematic approach to the design of digital bussing structures", Proceedings of Fall Joint Computer Conference, 1972, at 719 et seq., and in the chapter "buses", at 269 et seq. in the book "Computer Engineering" by C. Gordon Bell et al.

A central problem of bus system design is allocating a common bus in each case to only one of the units connected, so that information may be readily exchanged at optimum speed. Time losses during bus allocation and the actual information transfer must be avoided particularly if only one bus is available for interconnected components, such as processors, storage units or devices and input/output devices. Such components are being increasingly realized as individual chips with a very high internal processing speed and correspondingly fast information exchange. In many such systems, the bus imposes constraints when it comes to improving the processing speeds of the entire system still further.

When analyzing the transfer processes on a bus in greater detail, it will be found that the control methods used so far fail to efficiently utilize the bus transfer speed, as the bus is generally allocated to a connected unit for a time considerably exceeding that necessary for the actual data transfer. In addition, the bus is frequently allocated to units which, although having made a bus request, are temporarily prevented from transferring information for other reasons.

IBM Technical Disclosure Bulletin, Vol. 22, No. 4, Sept. 1979, page 1527 describes how a bus can be utilized more efficiently with respect to time by interleaving the times of several storage access operations. However, this method necessitates that suitable storage types be connected to the bus. European Pat. No. 86 601 concerns a multiprocessor system with special circuits suppressing those bus access requests that are bound to fail from the start because the requested unit is handling other requests at the time. For installing such circuits it is necessary, however, that the structure of the units connected to the bus be modified, thus leading to an increase in cost which is not always tolerable.

SUMMARY OF THE INVENTION

It is an object of the present invention to provide a method of the previously described kind, by means of which the use, and thus the transfer capacity, of the bus can be improved, and which is suitable for all known bus systems; it is an additional object to provide arrangements for implementing the method which involve few means and little expenditure at high processing speeds.

According to the invention, it is determined before bus allocation which operation a requesting unit intends to perform and which other unit is to be requested for the intended bus use. Status information on the addressed unit and the current status of the bus are considered during allocation to decide whether an access request is granted or not. Allocation is effected on the basis of all current conditions and it is possible to need also those access requests that would have been deferred by less sophisticated conventional allocation methods. The feature of recognizing different bus commands also permits providing the requesting units with additional commands, by means of which the priority of the respective unit may be dynamically changed for bus access operations. The invention is suitable for use in a central control unit (arbiter) for bus allocation as well as for decentralized allocation; it can be used for synchronous and asynchronous bus operation.

BRIEF DESCRIPTION OF THE DRAWINGS

Other objects and advantages of the invention will be apparent from the following description taken in connection with accompanying drawings wherein.

Figure 1:
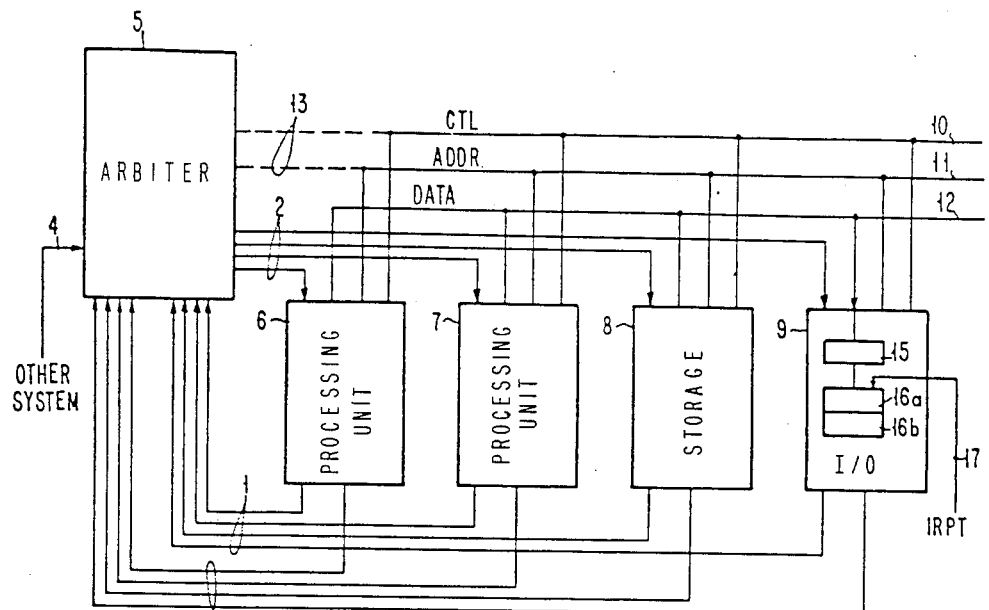
FIG. 1 is a block diagram of a bus-oriented computer system with a central arbiter.

Referring now to the drawings and first to FIG. 1, two processor units (PU) 6 and 7, a common storage 8 and several input/output (I/O) devices 9 are connected to a bus system comprising three buses 10-12. Bus 10 exchanges control information, bus 11 exchanges addresses of the connected units, and bus 12 exchanges data (and, if necessary storage addresses). Through a plurality of lines 3 each individually connected to a different unit or device, units 6 to 9 emit bus request signals over lines 3 to a central arbiter 5 which issues a bus allocation signal to one of the units on one of lines 2. If bus request signals are simultaneously encountered on more than one of lines 3 thus signifying a potential bus conflict, bus arbiter 5 uses a known priority method to allocate use of its bus system to a single requesting unit.

In addition to bus-oriented computers with a central arbiter, as shown in FIG. 1, there are systems in which the arbiter functions are distributed among various units. The invention may also be used for the latter type of system but will be described in detail below with reference to a central arbiter.

In accordance with the invention, allocation logic in arbiter 5 is extended such that additional information not considered in prior art systems is evaluated and used for bus allocation. For that purpose, further lines 1 are provided, several of which extend as separate lines between the arbiter 5 and the connected units, while others are common lines with several connections. In another embodiment of the invention, the information exchanged on lines 1 may also be exchanged on one or several buses 10 to 12 if the arbiter is provided with suitable connecting lines 13. Combinations of the two embodiments are also conceivable.

For optimal bus allocation, arbiter 5, in addition to the bus request signals and the address of the requesting units, as was previously the case, receives the following signals:
1. A bus command specifying the operation which the requesting unit wants to perform on the bus,
2. The address of the unit that is requested by a requesting unit,
3. A signal "unit busy" from each of the units connected to the bus,
4. A signal "bus busy" from each of the units connected to the bus.
5. A signal "unit receptive" from each of the units connected to the bus, and
6. A signal "expected access end" from each of the units connected to the bus.

In the most general form, separate lines are provided for all of these signals (except for "bus busy") between the respective units and arbiter 5 for fast bus allocation.

Before explaining the above signals in detail, the inefficient utilization of buses in conventional systems will be described below by way of the time diagram in FIG. 2. Once a bus has been allocated to a requesting unit, it will be used by that unit for the entire time T1, even though the actual transfer processes on the bus require only the times T2 (for address transfer) and T3 (for actual data transfer). The time ΔT between these transfer processes is required by the requested unit, for instance, for accommodating and verifying the address on the address bus and for providing the requested data. In unfavorable cases, the addressed unit may be temporarily unavailable so that the desired data cannot be transferred. In known systems, this situation is detected only after some time has elapsed, for instance, when no acknowledge signal is received from the requested unit.

Figure 2A:
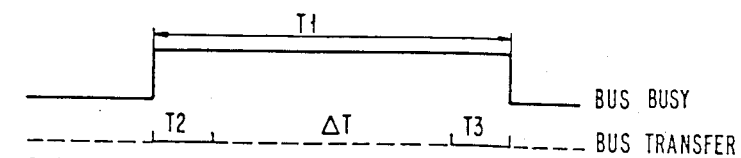
FIG. 2A is a time diagram representing the busy times of a prior art bus system.
Figure 2B:
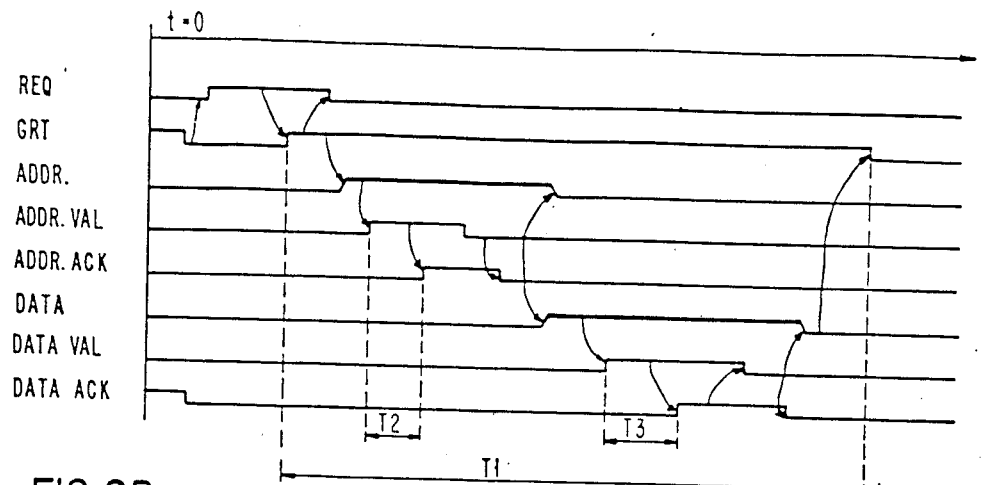
FIG. 2B is a time diagram representing the busy conditions of the prior art bus.

FIG. 2B shows a more detailed time diagram of the example explained by means of FIG. 2A in an asynchronous bus system operating on the known handshake principle. The time sequence of the individual signals and signal edges is shown in the usual manner by means of arrows. In the illustrated example, one of the processors connected to the bus wants to read data from storage. To that end, the processor issues a bus request signal REQ through one of lines 3 (FIG. 1) if a previous bus allocation GRT on line 2 has been reset. If the bus is allocated, a grant signal GRT goes to up level, resetting the request signal REQ. The storage address ADDR, from which data are to be fetched, is applied to bus 12, subsequently indicating by ADDR VAL on control bus 10 that ADDR signals are valid. According to a usual handshake approach, the storage then issues the acknowledge signal ADDR ACK on control bus 10, indicating that the address signal has been successfully received. Thus, the actual address exchange requires only the time T2; in actual fact, however, the bus as been busy since the occurrence of the positive edge of signal GRT.

If the data to be read are available in the requested storage, DATA signals are placed on data bus 12, with the signal DATA VAL, emitted on control bus 10 a short time later, indicating that DATA is valid. When REQUESTING processor has received the data, it places an acknowledge signal DAT ACK on bus 10, resetting signal DATA VAL and thus the grant signal GRT for the bus. Although data are exchanged only during the time T3, the bus is kept busy for the entire time T1.

Such inefficient bus use can be eliminated if all or some of the afore-mentioned signals are made available to the arbiter, thus avoiding gaps (idle times) in bus occupancy.

Figure 3:
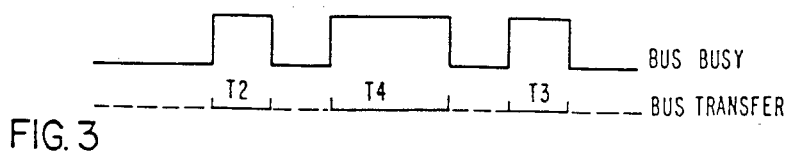
FIG. 3 is a pulse diagram for allocating the bus according to the method proposed herein.

FIG. 3 shows an example of interleaved bus use. If after the start of the transfer process of FIG. 2A, it is obvious to the arbiter from the time conditions encountered during each bus operation that there is a bus request from a second unit, which could be handled in the time T4, the arbiter allocates the bus to the second unit for the previously unused time interval ΔT.

During bus allocation, the afore-mentioned signals are used as follows:

Signal "unit busy"

By this signal, each unit tells the arbiter that it is incapable at that stage of participating in the bus transfer, because other jobs are being handled, for example, or a communication with a third unit is still to be completed. Therefore, bus requests from other units to such an unavailable unit are not granted.

To reduce a unit's time of unavailability to a minimum, its design may be such that bus connect registers 15, which are usually contained in the I/O units of FIG. 1, are connected to follow one or several buffer registers 16a, 16b in which the contents of connect registers 15 are stored immediately after completion of a bus transfer, so that registers 15 are subsequently free for further transfer operations. Another design measure consists in releasing the unit connected to the bus even if one of its subunits is still busy. In such a case, the subunit that is still busy will also have to be indicated to the arbiter, so that only the bus requests for the busy subunit are postponed.

Signal "bus busy"

This signal is emitted by the units connected to the bus at times during which actual transfer processes are taking placed on the bus (see FIG. 2B). Bus allocation is effected only if neither the signal "unit busy" nor the signal "bus busy" is encountered.

Address of requested unit

Each requesting unit supplies to the arbiter the address of the unit with which communication on the bus is requested. This information enables the arbiter to evaluate the signal "unit busy" accordingly. In addition, the arbiter is capable of telling from the address the characteristics of the requested unit and evaluating such characteristics for optimum bus use. In known systems, the address of the requested unit is only fed to the other connected bus units but not to the arbiter.

Signal "bus command"

This signal tells the arbiter which operation the requesting unit wants to perform on the bus. Examples of bus operations are:

The requesting unit wants to read data from the requested unit.

The requesting unit want to write data into the requested unit.

The requesting unit emits a trigger signal for a particular function in the requested unit.

The requesting unit want to trigger a data exchange between two further units connected to the bus.

The information on the intended bus operation alone or along with the afore-mentioned signals enables the arbiter to eliminate bus idle times by causing other waiting bus requests with matching time characteristics to be handled which would have been serviced later by conventional bus allocation. Such interleaved bus use is particularly suitable for synchronously operated bus systems in which an accurate time pattern, depending on the respective bus operation and the units involved, is known for each access. This increases the traffic on such synchronous buses, thus improving their performance particularly in conjunction with multimicroprocessor systems where they have already been employed in preference to other bus systems, as they do not require synchronization processes with acknowledge signals reducing the bus speed.

The bus allocation method proposed herein can also be used for asynchronously driven bus systems in which synchronization is effected by acknowledge signals. For interleaved bus access in such systems, the attached units must tell the arbiter at what time an operation currently being performed is expected to be completed, for which purpose the signal "expected access end"

is used. This signal indicates, for example, the time which a periodically refreshed storage required for outputting the requested information to the bus. This signal may also be such that it indicates only a minimum time that still remains before the requested unit is likely to respond.

Signal "unit receptive"

By means of this signal, each unit indicates that it is not yet available for bus transfer but that it may be requested after one or several bus cycles. As the arbiter thus knows for certain that the requested unit will be receptive after a particular time, it is able to prepare the allocation of the bus, so shortening its occcupancy over conventional methods. In practice, the signal "unit receptive" will be generated when a unit receives the contents of its input registers in its data flow or in the above-described buffer registers 16 (for example, in response to an interrupt signal (IRPT (FIG. 1) on line 17), so that the input registers are ready for fresh data. By means of the signal "unit receptive" much time can be saved over prior art structures where the bus is kept busy until the connect registers have been unloaded.

Evaluation of bus commands enables the artiber to perform entirely new functions. Examples of such functions will be described below, such as dynamically changing priorities during bus allocation as well as implementing new diagnostic functions.

Figure 4A:
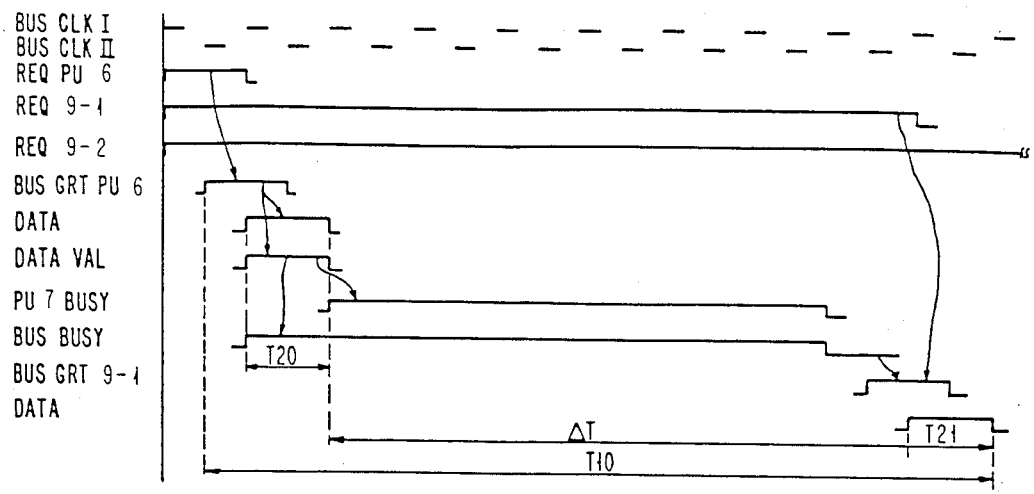
FIG. 4A is a pulse diagram for allocating the bus in a synchronous prior art system.
Figure 4B:
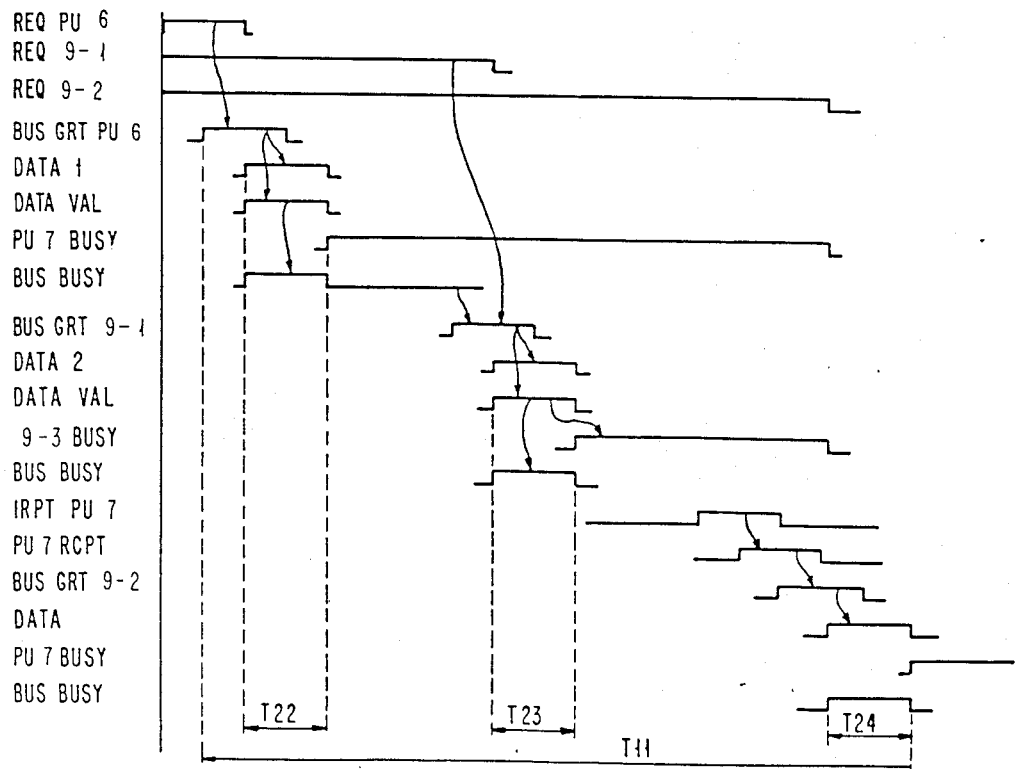
FIG. 4B is a pulse diagram for allocating the bus in a synchronous system according to the method proposed herein.

FIGS. 4A and 4B are time diagrams for bus transfer operations in a synchronous system using conventional methods (FIG. 4A) and addition signals (FIG. 4B), as are proposed in connection with the present invention. The top-most two lines in FIG. 4A (Which also hold for FIG. 4B) show the clock signals used during synchronous operation. They are designated as BUS CLK I and BUS CLK II. Also, in these figures individual I/O devices are respectively designated 9-1, 9-2, etc.

FIG. 4A shows the case where PU 6 wants to communicate with PU 7 and I/O device 9-1 simultaneously wants to perform a transfer operation with I/O device 9-3. In addition, it is assumed that I/O device 9-2 wants to communicate with PU 7 after the latter has completed its transfer process with PU 6. For that task, there are three requests signals REQ PU 6, REQ 9-1 and REQ 9-2 on request lines 1. PU 6, which is the first processor to be allocated the bus (by signal BUS GRT), supplies the data DATA, and indicates their validity on control bus 10 by the signal DATA VAL. Subsequently, PU 7 is still busy, which is indicated by the signal PU 7 BUSY, so that the bus is released only after that signal has been reset; this is indicated by the time diagram of the bus busy signal BUS BUSY. It is only after the bus is again available that the allocation signal for I/O device 9-1 can be emitted (BUS GRT 9-1) and that data can be transferred from unit 9-1 to unit 9-3. It is only at that stage that the request signal REQ 9-2 (not shown in FIG. 4A) will be considered.

For servicing the two requests REQ PU 6 and REQ 9-1, a total time T10 is required, even though the bus is only busy for the times T20 and T21. The reason for the delay is obvious: As the arbiter does not "know" that the access request of unit 9-1 is addressed to unit 9-3, bus allocation also has to consider the case that unit 9-1 may want to access PU 7 which has just received data that art still to be stored in its input registers. It is only after such data have been fetched from the input registers that PU 7 will again be available; up to that time, the unit busy signal is emitted by PU 7.

By means of the additional signals proposed herein, the arbiter is capable of handling the task explained by means of FIG. 4A much faster. According to FIG. 4B, the request signals REQ PU 6, REQ 9-1 and REQ 9-2 are also emitted in this case. As in the previous example, PU 6 because of its priority is the first to be allocated the bus (signal BUS GRT PU 6), to supply the data (Data 1) and to emit a data validity signal (DATA VAL). PU 7 then emits the busy signal PU 7 BUSY, as in the previous case, until its input registers become available for fresh data. However, deviating from the previous case, the bus busy signal (BUS BUSY) is reset as soon as the data validity signal occurs, thus ensuring that the data are in the input registers of processor PU 7. After the bus busy signal has disappeared, the bus can be allocated to unit 9-1 (signal BUS GRT 9-1), as the arbiter knows (from the destination address notified to it) that no access is to be made to PU 7 which is still busy. Subsequently, the data for unit 9-3 (DATA) are placed on the bus and the validity signal (DAT VAL) is applied. Unit 9-3 then emits the busy signal which is applied until the input registers of unit 9-3 are released for further data. The bus busy signal BUS BUSY disappears as soon as the data have reached the input registers of unit 9-3, so that the bus is available for further transfers.

The transfer request still outstanding from unit 9-2 to processor PU 7 is explained in the lower portion of FIG. 4B. The input registers of PU 7 still contain the data that have just been transferred by PU 6. The contents of the connect register in PU 7 are read in response to an interrupt signal (IRPT PU 7) which PU 7 either generates itself when data are to be entered into its internal data flow or which is applied to it from the outside. The interrupt signal leads to a sequence of steps, whose times are predetermined, and enables PU 7 to emit the "receptive" signal (PU 7 RCPT), indicting to the arbiter that processor PU 7 will be reavailable after a particular time. This information causes the bus to be allocated to unit 9-2 (BUS GRT 9-2) already at that time, so that the data of 9-2 are placed on the bus the very moment PU 7 ceases to be busy (the signal PU 7 BUSY disappears). As in the previous case, the bus is only required for the time it takes the data from unit 9-2 to reach the input registers of PU 2 which emits the busy signal (PU 7 BUSY). Thus, the actual bus busy time is defined by T22, T23 and T24.

The total time required for all three transfer processes is designated as T11 in FIG. 4B; as will be seen, this time is much shorter than the time T10 needed for only two transfer processes in FIG. 4A.

In multiprocessor systems, the management of shared resources, such as the common storage, plays a significant role. If two processors, for example, PU 6 and PU 7 in FIG. 1, are both entitled to write data into storage 8, care must be taken that only one processor and the storage communicate at any one time. For that purpose, special instructions are known from the art, by means of which data on the busy state of the resource may be obtained and reset in the same cycle. An example of such an instruction is the "Test and Set" instruction in IBM Systems 360/370. In the afore-mentioned example of two processors, which are connected to a common storage through a bus, the prior art uses particular storage position for indication. If a processor wants storage access, it issues a bus access request, in order to test and, if necessary, set the indicator bit. If the storage has already been allocated to the contending processor, the requesting processor repeats the test and set instruction until such time as it gains control over the storage. Each of these requests keeps the bus unnecessarily busy, which leads to high time losses particularly in cases where the requesting processor has a high priority and thus is allocated the bus much more frequently than the processor to whom the storage is currently assigned.

This unsatisfactory situation is resolved by an allocation scheme in which the requesting processor, after the first unsuccessful test and set instruction, gains storage access by a bus command which differs from the usual (read storage) bus command. Upon receipt of that second command, the arbiter lowers the bus allocation priority for that access request without influencing the priority for other bus requests of that processor. This reduces the frequency of the test and set instructions of that processor and unnecessary bus use. If the requested resource, in this case the storage, is later on released by the contending processor, the original priority for the test and set instructions will be restored.

When shared resources are accessed, the priority may also be dynamically changed by interconnecting several bus-oriented processor systems according to FIG. 1. For that purpose, control lines 4 are used which extend to the arbiter from other connected processors. Thus, other processors requesting access to their own resources (such as storages) may be granted highest priority for certain periods of time.

The method proposed herein for dynamically changing the priorities requires no special circuitry for the units connected to the bus, as does the prior art concept involving latch and indicator circuits according to European Patent Application No. 86 601.

An arbiter capable of recognizing bus commands is also suitable for diagnostic applications. If an error occurs in a connected unit, that unit emits a bus request signal using a bus command which leads to high priority bus allocation if the bus busy signal is absent. For that purpose, the individual units connected to the bus must be designed such that they recognize a diagnostic command even when they are actually busy and emitting the "unit busy" signal; processing in the connected units must be stopped when the diagnostic command is encountered, in order to freeze the respective system status for error analysis later on. Such a diagnostic processor performed on the usual bus eliminates additional buses known systems require for connecting system components to a service processor for maintenance purposes.

The diagnostic ability is improved still further by a push-down storage into which all data required for characterizing or retrying previously performed bus operations are written. This includes in each case the bus command, the address of the requesting unit (designated by the number of the request line) and the address of the requested unit and bus status signals, if any. If an error has occurred, the system is frozen and analyzed by means of the push-down storage data on previously performed bus operations or such operations are automatically repeated by means of the push-down storage data.

Figure 5:
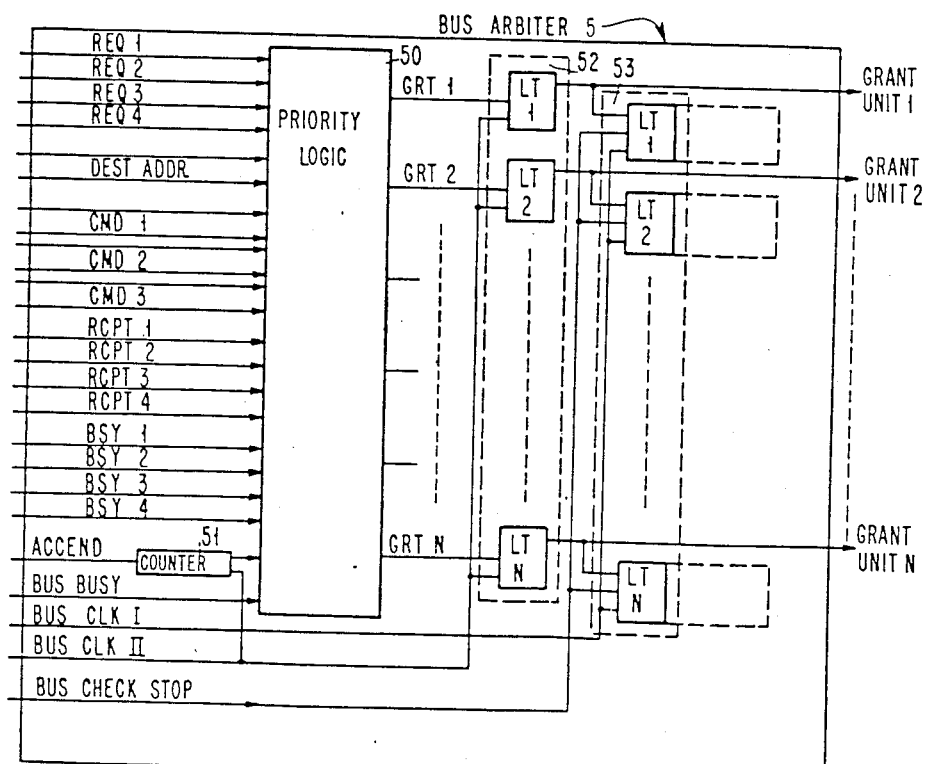
FIG. 5 is a detailed block diagram of the arbiter shown in FIG. 1.

Referring now to FIG. 5, the previously described signals are applied to a priority logic 50, in arbiter 5:
  individual bus requests REQ n, where n designates one of the requesting units,
  the bus commands CMD n,
  the destination address DEST ADDR,
  the unit busy commands BSY n,
  the signals "unit receptive" RCPT n,
  signals "expected access end" ACCEND,
  the signal bus busy BUS BUSY.

The signals ACCEND set a counter 51 which is connected to clock control BUS CLK II and which only emits a signal if the count has dropped to zero. Priority logic 50 emits the grant signals GRT for the individual units, which are stored in latch circuits 52 for one clock cycle; the outputs of the latch circuits 52 are connected to lines 2 transmitting the grant signal to the individual units. In addition, the output of the latch circuits 52 is connected to further latch circuits 53 (or to a chain of tandem-connected latch circuits 53) which form part of the afore-mentioned push-down storage and which can be frozen by the bus error signal (BUS Check Stop) in the case of an error. The entire circuit shown in FIG. 5, or only parts thereof, may take the form of an integrated circuit.

It should be obvious to those skilled in the art that many changes can be made without departing from the scope of the invention as defined in the appended claims.

Having thus described my invention, what I claim as new, and desire to secure by Letters Patents is:

1. In a data processing system having a plurality of data processing units connected to and sharing use of a bus system, said processing units including requesting units which intiate use of said bus system and requested units which are needed by the requesting units to use said bus system, arbitration means connected to each of said units for controlling which requesting unit will be granted use of said bus system at any given time including a time when there are plural requesting units concurrently requesting use of said bus system, said arbitration means comprising a plurality of bus request lines each connected to different ones of said units for receiving bus request signals from said units, said arbiter further comprising a plurality of bus grant lines connected to each of said units for transmitting over one of said lines to a selected requesting unit a bus grant signal signifying that such requesting unit can use said bus system at such given time, the improvement comprising:

first means in said units for providing status signals indicative of the status of each individual unit, said status signals including unit busy signals indicating the busy state of each individual unit, second means in said units for providing bus operation signals which specify the type of operation to be performed on the bus by a requesting unit, said type being one of a requesting unit receiving data from or sending data to a requested unit, third means connected to said first and second means and said arbitration means for transmitting said status signals and said bus operation signals from said first and second means to said arbitration means, fourth means in each of said units and connected to said bus system and providing thereto a bus busy signal, fifth means connected to said arbitration means and supplying thereto the addresses of requested units respectively requested by requesting units, said arbitration means being operative in response to receiving said bus request signals, said addresses of requested units, said status signals and said bus operation signals, to allocate the use of said bus to any requesting unit for performing a specified bus operation by transmitting to such requesting unit said bus grant signal, said arbitration means being operative to select such requesting unit from concurrent plural requesting units having different priorities by determining which requesting unit has the highest priority and is associated with a requested unit for which said busy state signal is inactive.

2. Apparatus in accordance with claim 1 wherein said third means comprises a plurality of separate lines for separately transmitting each of said status signals and said bus operation signals to said arbitration means.

3. Apparatus in accordance with claim 1 wherein said third means comprises bus means common to all of said units.

4. Apparatus in accordance with claim 1 wherein said arbitration means comprises a plurality of push-down registers for storing said status signals, said addresses of requested units, said bus operation signals and addresses of requesting units.

5. Apparatus in accordance with claim 1 comprising:
sixth means connected to said arbitration means, said bus system and said processing units for dividing the time of use of said bus system by a selected requesting unit into two periods displaced by an interleaved period, said sixth means being further operative to allocate another selected requesting unit to use said bus system during said interleaved period.

6. Apparatus in accordance with claim 1 wherein said arbitration means generates said bus grant signal for a requesting unit of lower priority whose associated requested unit is available for use even though there is a concurrent request from a requesting unit having a higher priority but whose associated requested unit is busy.

7. The method of controlling the use of a bus in a data processing system having a plurality of processing units connected to and sharing use of a common bus, said processing units including requesting units which initiate use of said bus and requested units which are needed by the requesting units to use said bus, said system further having arbitration means connected to said processing units and said bus for allocating use of said bus to a selected one of said requesting units when more than one requesting unit concurrently requests use of said bus, said requesting units having different predetermined priorities, comprising the steps of:

generating within each of said processing units status signals indicating the status of each unit as to whether each unit is busy or available for use with a requesting unit and transmitting such status signals to said arbitration means;

generating within each requesting unit and transmitting to said arbitration means a request signal, an address of a requesting unit, and command signals specifying whether data will be sent by said requesting unit to said requested unit or received by said requesting unit from said requested unit;

storing said status signals of each processing unit in said arbitration means;

determining, in said arbitration means and in response to each request signal, whether the requested unit needed by the requesting unit which generated such request signal is busy or is available for use, said determining step being done by using the address of the requested unit to look up the corresponding status signal stored in said arbitration means;

and allocating the use of said bus to the one of plural, concurrent requesting units having the highest normal priority and whose associated requested unit is available for use.

8. The method in accordance with claim 7 wherein said allocating step comprises allocating use of said bus to a requesting unit having a lower priority and whose associated requested unit is available for use even though there exists a request signal from a higher priority requesting unit whose associated requested unit is busy.

9. The method in accordance with claim 7 comprising:
dividing the time during which a requesting unit and a requested unit use said bus into two periods separated by an interleaved period, and allowing another requesting unit to use said bus during said interleaved period.

* * * * *